US 9,380,174 B2

(12) United States Patent
DeRoller et al.

(10) Patent No.: US 9,380,174 B2
(45) Date of Patent: Jun. 28, 2016

(54) METHODS AND SYSTEMS FOR AUTOMATICALLY CONVERTING A MOBILE RENDERING JOB TO A SECURE RENDERING JOB

(71) Applicant: Xerox Corporation, Norwalk, CT (US)

(72) Inventors: Matthew H. DeRoller, Webster, NY (US); Aakash Mankani, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/183,779

(22) Filed: Feb. 19, 2014

(65) Prior Publication Data

US 2015/0237219 A1    Aug. 20, 2015

(51) Int. Cl.
*H04N 1/00* (2006.01)
*G06F 21/60* (2013.01)
*G06F 3/12* (2006.01)

(52) U.S. Cl.
CPC .............. *H04N 1/001* (2013.01); *G06F 3/1222* (2013.01); *G06F 3/1238* (2013.01); *G06F 3/1292* (2013.01); *G06F 21/608* (2013.01); *H04N 1/00307* (2013.01); *H04N 2201/0075* (2013.01); *H04N 2201/0094* (2013.01); *H04N 2201/32* (2013.01)

(58) Field of Classification Search
CPC ... H04N 1/001; H04N 2201/32; G06F 21/608
USPC ........................................ 358/1.13, 1.14, 1.15
See application file for complete search history.

(56) References Cited

U.S. PATENT DOCUMENTS

| | | | |
|---|---|---|---|
| 6,751,732 B2 | 6/2004 | Strobel et al. | |
| 7,576,883 B2 | 8/2009 | Ragnet et al. | |
| 7,844,255 B2 | 11/2010 | Petrov et al. | |
| 8,339,625 B2 | 12/2012 | Roche et al. | |
| 8,488,164 B2 | 7/2013 | Boskovic | |
| 8,532,330 B2 | 9/2013 | Simske et al. | |
| 8,547,568 B2 | 10/2013 | Wang et al. | |
| 8,582,156 B2 | 11/2013 | Rudolph et al. | |
| 8,593,688 B2 | 11/2013 | Simske et al. | |
| 2002/0169002 A1 | 11/2002 | Imbrie et al. | |
| 2008/0007761 A1* | 1/2008 | Nishio | 358/1.14 |
| 2010/0309505 A1* | 12/2010 | Partridge et al. | 358/1.15 |
| 2011/0292445 A1* | 12/2011 | Kato | 358/1.15 |
| 2012/0300251 A1* | 11/2012 | St. Laurent | H04N 1/00244 358/1.15 |
| 2013/0077124 A1 | 3/2013 | Vojak | |
| 2013/0085968 A1 | 4/2013 | Schultz et al. | |
| 2013/0177153 A1 | 7/2013 | Gerraty | |

* cited by examiner

*Primary Examiner* — Kent Yip
(74) *Attorney, Agent, or Firm* — Kermit D. Lopez; Luis M. Ortiz; Ortiz & Lopez, PLLC (57) ABSTRACT

Methods, systems and processor-readable media for converting a mobile rendering job to a secure rendering job. A secure rendering module can be configured in association with a print path with respect to a mobile telecommunications device. A rendering job from the mobile telecommunications device configured with a mobile multifunction device user interface can be received by the secure rendering module. The document context (e.g., metadata) as well as the context of the MFD context (e.g., MFD location and activity) can be checked in order to determine a confidentiality of the rendering job. The rendering job can be securely transmitted to the MFD based on the confidentiality. An email notification with respect to the release of the secure rendering job can be sent to a user.

20 Claims, 5 Drawing Sheets

METHODS AND SYSTEMS FOR AUTOMATICALLY CONVERTING A MOBILE RENDERING JOB TO A SECURE RENDERING JOB

FIELD OF THE INVENTION

Embodiments are generally related to rendering and imaging devices such as, for example, printers, scanners, photocopy machines, and the like. Embodiments are also related to mobile telecommunications devices such as smartphones, tablet computing devices, and so on. Embodiments are also related to techniques for converting mobile rendering jobs to secure rendering jobs.

BACKGROUND

A MFD (Multi-Function Device) is a type of rendering or imaging device that incorporates the functionality of multiple devices in a single apparatus or system so as to offer a smaller footprint in a home or small business setting, or to provide centralized document management/distribution/production in the context of, for example, a large-office setting. A typical MFD can provide a combination of some or all of the following capabilities: printer, scanner, photocopier, fax machine, e-mail capability, and so forth. Networked MFDs (Multi-Function Devices) generally interact with an assemblage of varying rendering devices, client computers, servers, and other components that are connected to and communicate over a data network.

A secure rendering job such as, for example, human resource related material or a company confidential document sent to the MFD can be released and permitted to be rendered upon entry of a code and/or a personal identification number. The code and/or the personal identification number can be entered either at the MFD or utilizing another print management user interface to enable the MFD to print the secure rendering job. With the advent of mobile telecommunications devices (e.g., smartphones, tablets, etc.) and the pursuit of mobile user interfaces for multifunction devices, users often forget to set sensitive rendering job for secure rendering thereby causing insecure rendering of the job by the MFD.

Based on the foregoing, it is believed that a need exists for an improved method and system for automatically converting a mobile rendering job to a secure rendering job, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods and systems for managing a MFD (Multi-Function Device).

It is another aspect of the disclosed embodiments to provide for improved methods and systems for converting a mobile rendering job from a mobile telecommunications device to a secure rendering job with respect to a MFD.

The aforementioned aspects and other objectives and advantages can now be achieved as described herein. Methods and systems for converting a mobile rendering job to a secure rendering job are disclosed herein. In one example embodiment, a secure rendering module can be configured in association with a print path with respect to a mobile telecommunications device (e.g., smartphone, tablet, etc.). A rendering job from the mobile telecommunications device configured with a mobile multifunction device user interface can be received by the secure rendering module. A document context (e.g., metadata) as well as a MFD context (e.g., MFD location and activity) can be checked in order to determine the confidentiality of the rendering job. The rendering job can be securely transmitted to the MFD based on the level of confidentiality of the rendering job. An email notification with respect to the release of the secure rendering job can be sent to a particular user.

The document metadata can be read with respect to a keyword in a header, footer, and/or document properties utilizing a document PDL parser and a detail retrieval. The location of the MFD can be checked with respect to a user's primary work location and department in an asset database, a user database, and/or an AD/LDAP (Active Directory/Lightweight Directory Access Protocol) connector. The activity with respect to the target device can then be checked utilizing a job tracking record database. A data source and/or other enabler can also be checked to determine the confidentiality of the rendering job. Such checks can be enabled or disabled based upon user preference. Such an approach enables automatic and extensible, feasible checks for secure printing with respect to the mobile rendering job.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
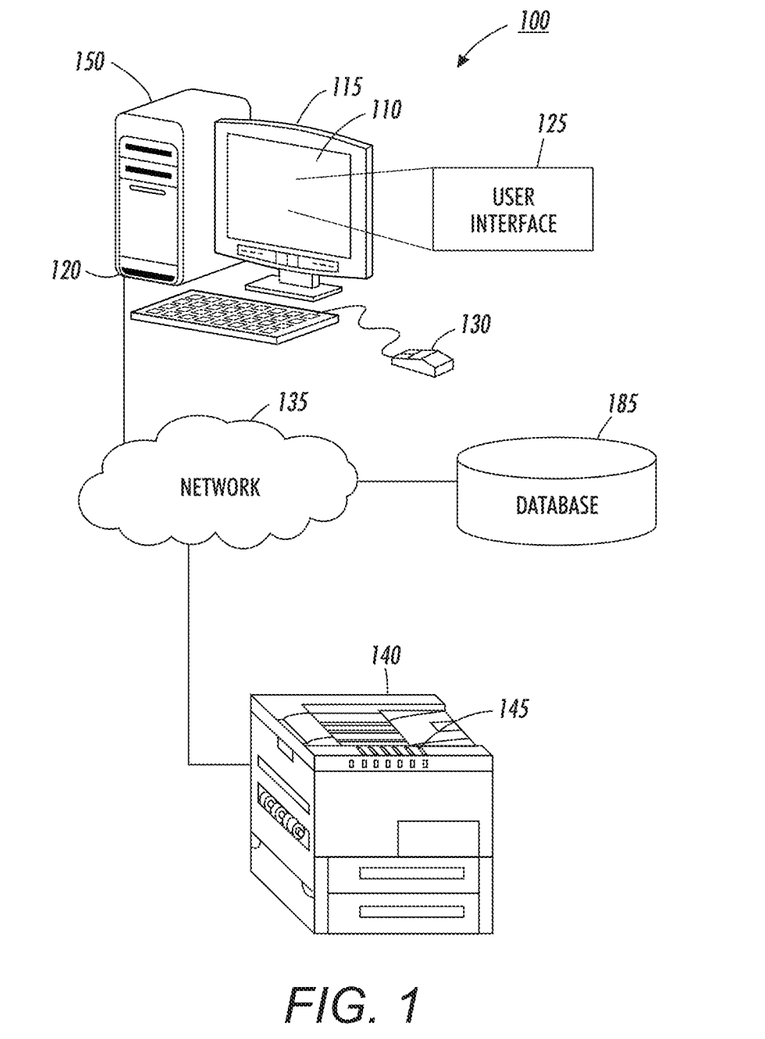
FIG. 1 illustrates an example of a multi-function device coupled to a data-processing apparatus through a network, in accordance with the disclosed embodiments.

Referring to FIG. 1, a system 100 can be configured to include one or more networked devices, such as a networked device 140 operatively coupled to a data-processing apparatus 110 through a data network 135. In some example embodiments, the networked device 140 may be a rendering or imaging device such as a printer, scanner, copy machine, etc. In other example embodiments, the networked device 140 may be a MFD, a file server, and/or a print server. The data-processing apparatus 110 can be, for example, a personal computer or other computing device, and generally includes a central processor 120, a display device 115, and an input device 130 (e.g., keyboard, mouse, etc.).

Note that as utilized herein, the term networked device can refer to an apparatus or system such as a printer, scanner, fax machine, copy machine, etc., and/or a combination thereof (e.g., MFD). Preferably, networked device 140 is a MFD capable of multiple rendering functions such as printing, copying, scanning, faxing, etc. In some example, the MFD 140 can be implemented with a single rendering function such as printing. In other example embodiments, the MFD 140 can be configured to provide multiple rendering functions such as scanning, faxing, printing and copying.

The data-processing apparatus 110 can be coupled to the MFD 140 (and other rendering devices) through a computer network 135. Network 135 may employ any network topology, transmission medium, or network protocol. The network 135 may include connections such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

The networked MFD 140 includes a user interface 145 such as a panel menu. The panel menu may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a rendering job with the driver for processing by the MFD 140.

The data-processing apparatus 110 also typically includes a GUI 125 for communicating rendering features for processing, for example, the rendering job to a user and accepting the user's selection of available rendering features. The user interface 125 displays information and receives data through device display and/or the keyboard/mouse combination. The interface 125 also serves to display results, whereupon the user may supply additional inputs or terminate a given session. In other embodiments, the data-processing apparatus 110 may be, for example, any computing device capable of being integrated within a network such as a laptop computer, personal computer, cellular telephone/Smartphone, tablet computing device, point-of-sale terminal, server, etc.

The input device of the networked device 140, for example, may be a local user interface 145 such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the disclosed embodiments, which can be embodied in the context of the data-processing apparatus 110 and the networked device 140 depicted in FIG. 1. The disclosed embodiments, however, is not limited to any particular application or any particular environment. Instead, those skilled in the art will find that the system and methods of the disclosed embodiments may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 2:
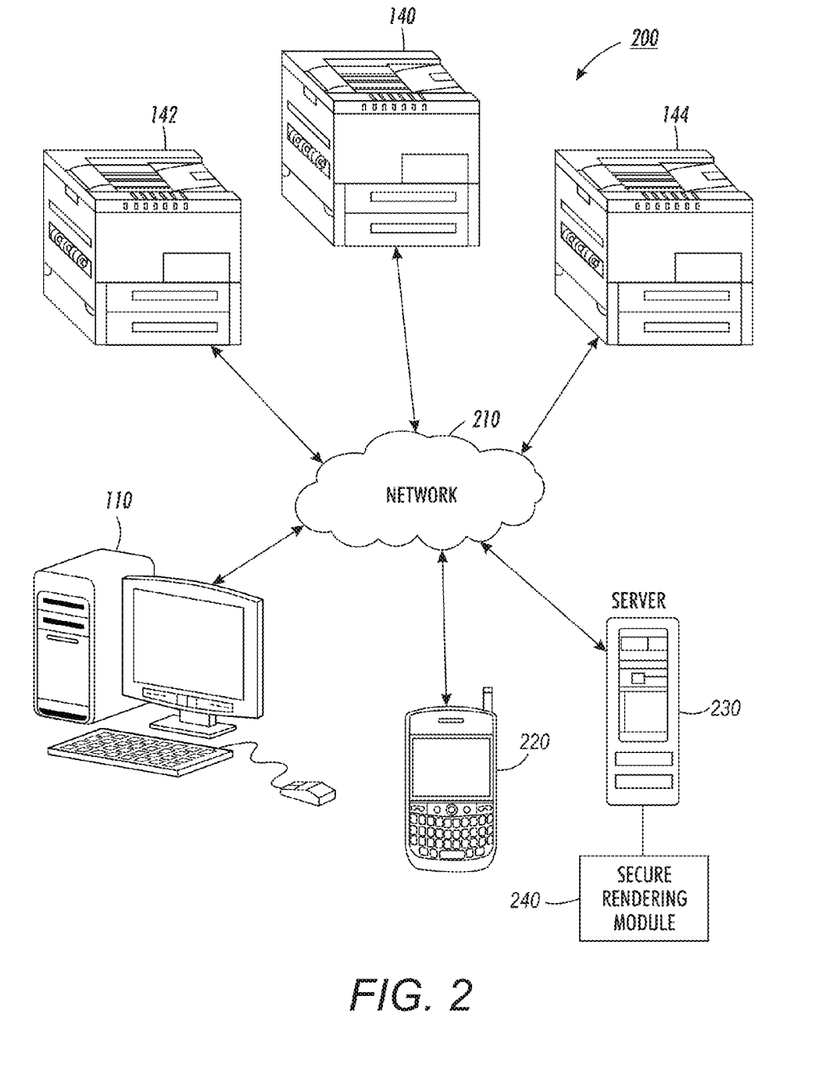
FIG. 2 illustrates a graphical representation of a device management system having a secure rendering module associated with a network, in accordance with the disclosed embodiments.

FIG. 2 illustrates a graphical representation of a device management system 200 that can be configured to include the use of a secure rendering module 240 associated with a network 210, in accordance with one possible embodiment. The device management system 200 shown in FIG. 2 generally includes network 210 associated with one or more networked MFDs 140, 142, and 144, a data-processing system 110, a mobile telecommunications device 220, and a server 230. Data-processing apparatus 110 depicted in FIG. 1 can be, for example, a server. Other devices such as, for example, desktops, network devices, palmtops, mobile phones, etc., may also be included in the network 210 as service providers. The MFDs 140, 142, and 144 can be located remotely with respect to each other, or alternatively, they may be located locally with respect to each other.

The typical MFD may act as a combination of a printer, scanner, photocopier, fax, and e-mail. While three MFDs 140, 142, and 144 are shown by way of example, it is to be appreciated that any number of MFDs may be linked to the network such as four, six or more rendering devices. In general, the MFDs 140, 142, and 144 can be employed to perform a rendering output function (e.g., printing, scanning, copying, faxing, etc.) within a networked environment. Note that MFDs 140, 142, and 144 are generally analogous to one another.

The secure rendering module 240 associated with the server 230 can be adapted for converting a mobile rendering job from a mobile telecommunications device 220 to a secure rendering job with respect to the MFDs 140, 142, and 144. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as flash drives, USB drives, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

Figure 3:
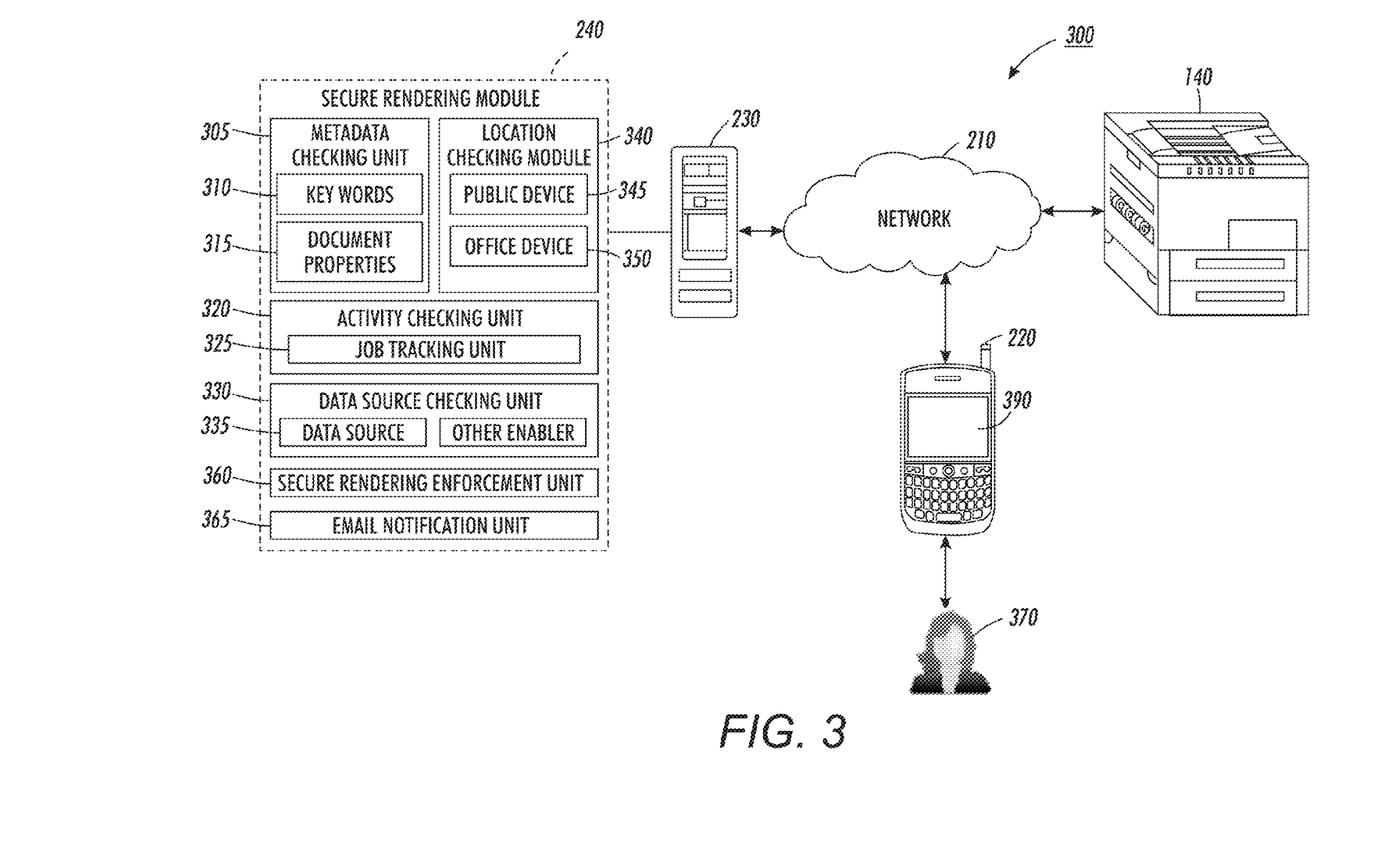
FIG. 3 illustrates a block diagram of a secure rendering system having the multi-function device connected to the mobile telecommunications device via a print server, in accordance with the disclosed embodiments.

FIG. 3 illustrates a block diagram of a secure rendering system 300 having the MFD 140 connected to the mobile telecommunications device 220 via the print server 230, in accordance with the disclosed embodiments. The secure rendering module 240 can be configured in association with the print server 230 with respect to the mobile telecommunications device 220. A rendering job from the mobile telecommunications device 220 configured with a mobile multifunction device user interface 390 can be received by the secure rendering module 240. The server 230 can be accessible to both the MFD 140 and the mobile telecommunications device 220. For example, the print server 230 can be on the internet, but any other location accessible to both the MFD 140 and the mobile telecommunications device 220 can be employed. The mobile telecommunications device 220 can make network requests that are forwarded through the print server 230 to the MFD 140, and receive responses back from the MFD 140, and vice versa.

The secure rendering module 240 can be configured to include a metadata checking unit 305 to read a document metadata. The metadata checking unit 305 parse documents for security reason with respect to a keyword 310 in a header, footer, and/or document properties 315, for example, MS word details. A location checking unit 340 with respect to the secure rendering module 240 checks location of the MFD 140 with respect to the user's primary work location, and department such as, for example, a public device 345 or an office device 350. If a user belongs to a human restricted department, then the secure rendering can be employed on devices outside the restricted area.

An activity checking unit 320 with respect to the secure rendering module 240 checks activity with respect to the target MFD 140 checked utilizing a job tracking record 325. For example, the job tracking record 325 can be employed to check level of activity with respect to the MFD 140. If the MFD 140 is busy, then the job may not be considered as secure. A data source checking unit 330 checks a data source 335 and other enabler to determine confidentiality of the rendering job. A secure rendering enforcement unit 360 securely transmits the rendering job to the MFD 140 based on the confidentiality. An email notification unit 365 transmits an email with respect to the secure rendering job to a user 370 in order to notify release of the secure rendering job. The checks can also be enabled or disabled based on user preference.

Figure 4:
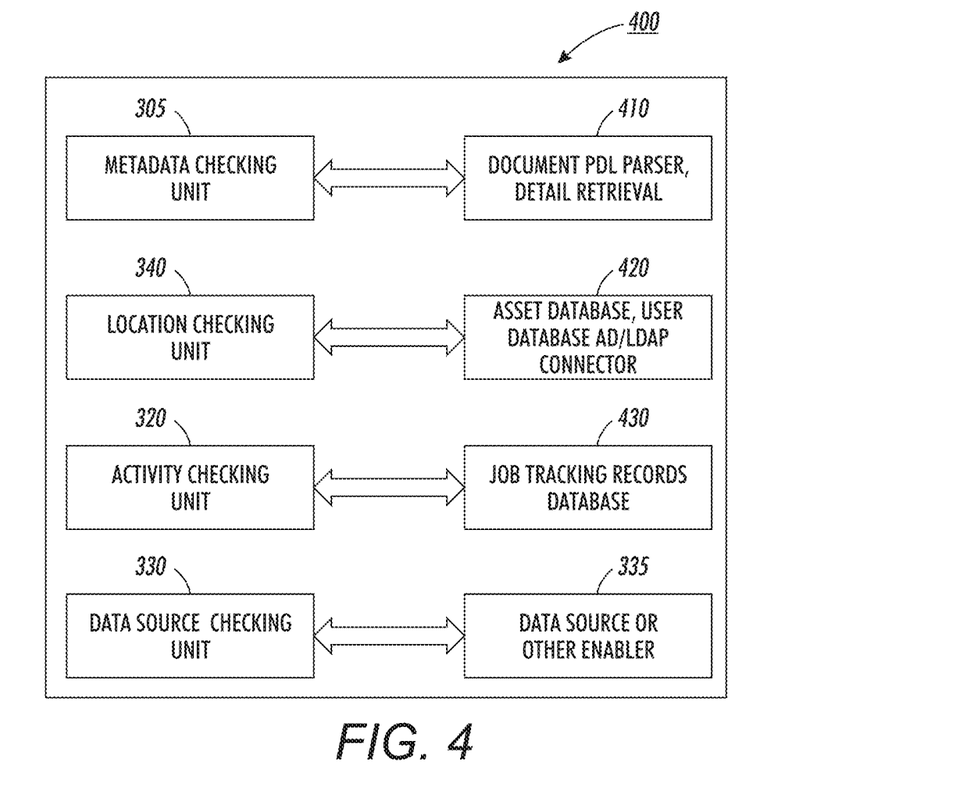
FIG. 4 illustrates an interaction diagram showing communication between checking units and database, in accordance with the disclosed embodiments.

FIG. 4 illustrates a schematic diagram 400 depicting communications between checking units and a database, in accordance with the disclosed embodiments. The metadata checking unit 305 can parse documents for security reasons, for example, utilizing a document PDL parser and detail retrieval 410. The location checking unit 340 checks the location of the MFD 140 with respect to the user's primary work location, a department in an asset database, a user database, and an AD/LDAP (Active Directory/Lightweight Directory Access Protocol) connector 420. The activity checking unit 320 checks the activity with respect to the target device 140 utilizing a job tracking record database 430. As also shown in FIG. 4, the data source checking unit 330 can check a data source 335 or other enabler.

Figure 5:
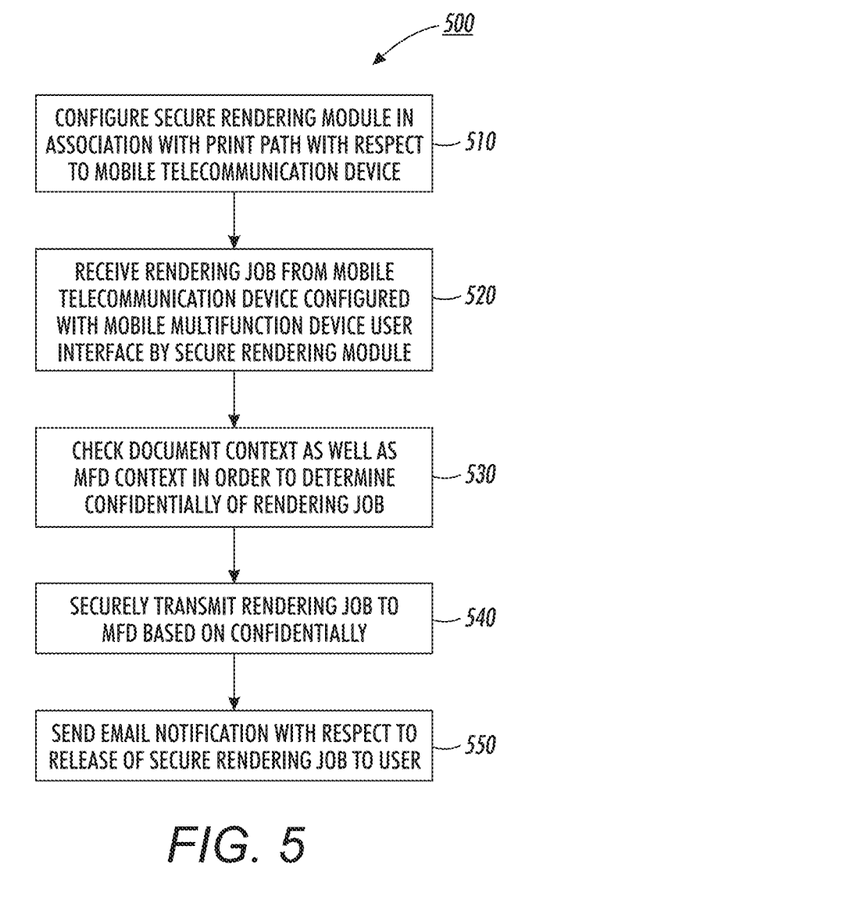
FIG. 5 illustrates a high level flow chart of operations illustrating logical operational steps of a method for converting a mobile rendering job to a secure rendering job, in accordance with the disclosed embodiments.

FIG. 5 illustrates a high level flow chart of operations illustrating logical operational steps of a method 500 for automatically converting a mobile rendering job to a secure rendering job, in accordance with the disclosed embodiments. As indicated at block 510, the secure rendering module 240 can be configured in association with a print path with respect to the mobile telecommunications device 220. As illustrated next at block 520, the rendering job from the mobile telecommunications device 220 configured with the mobile multifunction device user interface 390 can be received by the secure rendering module 240. Then as depicted at block 530, the document context (e.g., from meta data) as well as the MFD context (specifically printer location and activity such as number of print-jobs) can be checked in order to determine the confidentiality of the rendering job. Next, as described at block 540, the rendering job can be securely transmitted to the MFD 140 based on the determined confidentiality. Thereafter, as shown at block 550, email with respect to the secure rendering job can be transmitted to the user 370 in order to notify release of the secure rendering job.

The system 300 allows the mobile telecommunications device 220 and the MFD 140 to communicate securely with one another, while facilitating the control and extension of the MFD 140 through the mobile telecommunications device 220. The system 300 is capable of achieving high levels of usability with security assurances which are adequate for many real-world scenarios. The system 300 also enables extensible, feasible checks for automatic, mobile and secure print jobs.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for automatically converting a mobile rendering job into a secure rendering job, said method comprising:
   establishing wireless communications between a mobile telecommunications device and a multi-function device that communicate with each another via a print server;
   receiving through said print server a rendering job from said mobile telecommunications device configured with a mobile multifunction device user interface via a secure rendering module that enables secure rendering of said rendering job at said multi-function device via said wireless communications and facilitated by said print server;
   associating said secure rendering module with a print path with respect to said mobile telecommunications device;
   automatically checking a document context of said rendering job as well as a context of said multi-function device to determine a confidentiality of said rendering job to securely transmit said rendering job to said multi-function device based on said determined confidentiality of said rendering job;
   analyzing a location of said multi-function device with respect to a user primary work location and a department in an asset database, a user database, and an active directory/lightweight directory access protocol connector; and
   analyzing an activity with respect to said multi-function device utilizing a job tracking record database that communicates electronically with an activity checking unit of said secure rendering module.

2. The method of claim 1 wherein said mobile telecommunications device comprises at least one of a smartphone, tablet computing device, or a laptop computer.

3. The method of claim 1 further comprising sending an email notification with respect to release of said secure rendering job to a user so as to notify said user of said release of said secure rendering job.

4. The method of claim 1 wherein automatically checking said document context further comprises reading a document metadata with respect to a keyword in a header, a footer and a plurality of document properties utilizing a document PDL parser and a detail retrieval.

5. The method of claim 1 wherein said mobile telecommunications device comprises a server.

6. The method of claim 1 wherein said mufti-function device (MFD) comprises a networked MFD.

7. The method of claim 1 further comprising analyzing a data source and/or another enabler to determine said confidentiality of said rendering job.

8. The method of claim 1 further comprising automatically rendering said mobile rendering job securely based on said determined confidentiality.

9. A system for automatically converting a mobile rendering job into a secure rendering job, said system comprising:
   a processor;
   a data bus coupled to said processor; and
   a computer-usable medium embodying computer program code, said computer-usable medium being coupled to said data bus, said computer program code comprising instructions executable by said processor and configured for:
   establishing wireless communications between a mobile telecommunications device and a multi-function device that communicate with each another via a print server;
   receiving through said print server a rendering job from said mobile telecommunications device configured with a mobile multifunction device user interface via a secure rendering module that enables secure rendering of said rendering job at said multi-function device via said wireless communications and facilitated by said print server and wherein said secure rendering module is associated with a print path with respect to said mobile telecommunications device;
   automatically checking a document context as well as a context of said multi-function device to determine a confidentiality of said rendering job to thereafter securely transmit said rendering job to said multi-function device based on said determined confidentiality of said rendering job;
   analyzing a location of said multi-function device with respect to a user primary work location and a department in an asset database, a user database and an active directory/lightweight directory access protocol connector; and
   analyzing a data source and/or another enabler to determine said confidentiality of said rendering job.

10. The system of claim 9 wherein said mobile telecommunications device comprises at least one of a smartphone, tablet computing device, or a laptop computer.

11. The system of claim 9 wherein said instructions are further configured for sending an email notification with respect to release of said secure rendering job to a user so as to notify said user of said release of said secure rendering job.

12. The system of claim 9 wherein said instructions for automatically checking said document context further comprise instructions configured for reading a document metadata with respect to a keyword in a header, a footer and a plurality of document properties utilizing a document PDL parser and a detail retrieval.

13. The system of claim 9 wherein said document context comprises metadata.

14. The system of claim 9 wherein said mobile telecommunications device comprises a server.

15. The system of claim 9 wherein said multi-function device (MFD) comprises a networked MFD.

16. The system of claim 9 wherein said instructions are further configured for automatically rendering said mobile rendering job securely based on said determined confidentiality.

17. A non-transitory processor-readable medium storing computer code representing instructions to cause a process for automatically converting a mobile rendering job into a secure rendering job, said computer code comprising code to:
   establish wireless communications between a mobile telecommunications device and a multi-function device that communicate with each another via a print server;

receive through said print server a rendering job from said mobile telecommunications device configured with a mobile multifunction device user interface via a secure rendering module that enables secure rendering of said rendering job at said multi-function device via said wireless communications and facilitated by said print server;

associate said secure rendering module with a print path with respect to said mobile telecommunications device;

automatically check a document context associated with said rendering job as well as a context of said multi-function device to determine a confidentiality of said rendering job to securely transmit said rendering job to said multi-function device based on said determined confidentiality of said rendering job;

analyze a location of said multi-function device with respect to a user primary work location and a department in an asset database, a user database, and an active directory/lightweight directory access protocol connector; and analyze an activity respect to said multi-function device utilizing a job tracking record database that communicates electronically with an activity checking unit of said secure rendering module.

18. The processor-readable medium of claim 17 wherein said mobile telecommunications device comprises at least one of a smartphone, tablet computing device, or a laptop computer.

19. The processor-readable medium of claim 17 wherein said code further comprises code to send an email notification with respect to release of said secure rendering job to a user so as to notify said user of said release of said secure rendering job.

20. The processor-readable medium of claim 17 wherein said code to automatically check said document context further comprises code to read a document metadata with respect to a keyword in a header, a footer and a plurality of document properties utilizing a document PDL parser and a detail retrieval.

* * * * *